(12) United States Patent
MacLeod et al.

(10) Patent No.: US 9,176,845 B2
(45) Date of Patent: Nov. 3, 2015

(54) USE OF COMPILER-INTRODUCED IDENTIFIERS TO IMPROVE DEBUG INFORMATION PERTAINING TO USER VARIABLES

(75) Inventors: Andrew MacLeod, Markham (CA); Alexandre Oliva, Campinas (BR)

(73) Assignee: Red Hat, Inc., Raleigh, NC (US)

( * ) Notice: Subject to any disclaimer, the term of this patent is extended or adjusted under 35 U.S.C. 154(b) by 892 days.

(21) Appl. No.: 12/728,033

(22) Filed: Mar. 19, 2010

(65) Prior Publication Data
US 2011/0231829 A1  Sep. 22, 2011

(51) Int. Cl.
*G06F 9/44* (2006.01)
*G06F 11/36* (2006.01)

(52) U.S. Cl.
CPC .................... *G06F 11/3624* (2013.01)

(58) Field of Classification Search
None
See application file for complete search history.

(56) References Cited

U.S. PATENT DOCUMENTS

| | | | | |
|---|---|---|---|---|
| 5,754,860 A * | 5/1998 | McKeeman et al. | ......... | 717/124 |
| 5,812,854 A * | 9/1998 | Steinmetz et al. | ............ | 717/159 |
| 5,836,014 A * | 11/1998 | Faiman, Jr. | .................. | 717/159 |
| 5,842,021 A * | 11/1998 | Odani et al. | .................. | 717/159 |
| 5,956,512 A * | 9/1999 | Simmons et al. | ............. | 717/128 |
| 5,999,735 A * | 12/1999 | Radigan | ......................... | 717/152 |
| 6,002,879 A * | 12/1999 | Radigan et al. | ............... | 715/209 |
| 6,016,398 A * | 1/2000 | Radigan | ......................... | 717/152 |
| 6,072,952 A * | 6/2000 | Janakiraman | ................. | 717/155 |
| 6,425,122 B1 * | 7/2002 | Klingman | ..................... | 717/124 |
| 6,593,940 B1 * | 7/2003 | Petersen et al. | ............... | 715/700 |
| 6,708,325 B2 * | 3/2004 | Cooke et al. | ................... | 717/124 |
| 6,708,326 B1 * | 3/2004 | Bhattacarya | .................. | 717/124 |
| 6,721,945 B1 * | 4/2004 | Sinha | ............................. | 717/157 |
| 6,795,963 B1 * | 9/2004 | Andersen et al. | ............. | 717/130 |
| 6,874,140 B1 * | 3/2005 | Shupak | ......................... | 717/131 |
| 6,883,162 B2 * | 4/2005 | Jackson et al. | ................ | 717/124 |
| 6,938,185 B1 * | 8/2005 | Bebout et al. | ................... | 714/28 |
| 6,971,091 B1 * | 11/2005 | Arnold et al. | ................. | 717/130 |
| 7,493,630 B2 * | 2/2009 | Hunt | ............................. | 719/330 |
| 8,312,434 B2 * | 11/2012 | Bates et al. | .................... | 717/128 |
| 2002/0038452 A1 * | 3/2002 | Kasinsky | ...................... | 717/141 |
| 2002/0188831 A1 * | 12/2002 | Jackson et al. | ................ | 712/227 |
| 2003/0004671 A1 * | 1/2003 | Minematsu | .................... | 702/123 |
| 2003/0070117 A1 * | 4/2003 | Matsuki et al. | ................. | 714/25 |
| 2003/0126590 A1 * | 7/2003 | Burrows et al. | ............... | 717/154 |
| 2003/0204838 A1 * | 10/2003 | Caspole et al. | ............... | 717/130 |

(Continued)

OTHER PUBLICATIONS

Tayfun Elmas et al., "An Annotation Assistant for Interactive Debugging of Programs with Common Synchronization Idioms", Microsoft Research, 2009, <http://www.research.ibm.com/haifa/Workshops/padtad2009/present/padtad09-tayfun-elmas.pdf>, pp. 1-16.*

(Continued)

*Primary Examiner* — Thuy Dao
*Assistant Examiner* — Samuel Hayim
(74) *Attorney, Agent, or Firm* — Lowenstein Sandler LLP

(57) ABSTRACT

A method and system for improving debug information pertaining to user variables using a compiler. The method may include identifying a statement to be removed from its current position in an internal representation of a program by a compiler as part of the compiler optimization, replacing the statement to be removed with a debug annotation, adding references to the debug annotation in subsequent debug expressions referring to the removed statement, and emitting debug location information for a user variable using the debug annotation.

16 Claims, 6 Drawing Sheets

(56) References Cited

U.S. PATENT DOCUMENTS

| | | | | |
|---|---|---|---|---|
| 2004/0040013 | A1* | 2/2004 | Kalra | 717/129 |
| 2005/0183072 | A1* | 8/2005 | Horning et al. | 717/140 |
| 2005/0240820 | A1* | 10/2005 | Vannerson et al. | 714/35 |
| 2007/0006167 | A1* | 1/2007 | Luk et al. | 717/130 |
| 2007/0143742 | A1* | 6/2007 | Kahlon et al. | 717/124 |
| 2007/0226702 | A1* | 9/2007 | Segger | 717/130 |
| 2008/0263338 | A1* | 10/2008 | Ohkubo et al. | 712/227 |
| 2008/0270988 | A1* | 10/2008 | Li et al. | 717/125 |
| 2010/0005249 | A1* | 1/2010 | Bates et al. | 711/154 |
| 2010/0050159 | A1* | 2/2010 | Daniel | 717/125 |
| 2010/0138820 | A1* | 6/2010 | Joshi | 717/158 |
| 2011/0231829 | A1 | 9/2011 | MacLeod et al. | |
| 2013/0019228 | A1* | 1/2013 | Bates | 717/129 |
| 2013/0290942 | A1* | 10/2013 | Ishizaki | 717/151 |

OTHER PUBLICATIONS

Kevin Camera et al., "An Integrated Debugging Environment for FPGA Computing Platforms", IEEE, 2008, <http://ieeexplore.ieee.org/stamp/stamp.jsp?tp=&arnumber=4629950>, pp. 1-6.*

Mahmood Ali et al., "Enforcing Reference and Object Immutability in Java", ACM, 2008, <http://delivery.acm.org/10.1145/1450000/1449831/p725-ali.pdf>, pp. 1-2.*

"Annotation File Specification", MIT, 2008, <http://types.cs.washington.edu/javari/index-file-format.pdf>, pp. 1-7.*

Muhammad Malik et al., "A Case for Automated Debugging Using Data Structure Repair", IEEE, 2009, <http://ieeexplore.ieee.org/stamp/stamp.jsp?tp=&arnumber=5431723>, pp. 1-5.*

Tayfun Elmas et al., "An Annotation Assistant for Interactive Debugging of Programs with Common Synchronization Idioms", ACM, 2009, <http://delivery.acm.org/10.1145/1640000/1639632/al0-elmas.pdf>, pp. 1-11.*

Matz, Michael "Improving the precision of GCC's debug information" Proceedings of the GCC Developers' Sumit. Jun. 17-19, 2008. Ottawa, Onatrio Canada. 8 pages.

Oliva, Alexandre "A Plan to Fix Local Viable Debug Information in GCC" Proceedings of the GCC Developers' Sumit. Jun. 17-19, 2008. Ottawa, Ontario Canada. 12 pages.

\* cited by examiner

USE OF COMPILER-INTRODUCED IDENTIFIERS TO IMPROVE DEBUG INFORMATION PERTAINING TO USER VARIABLES

TECHNICAL FIELD

Embodiments of the present invention relate to compilers. Specifically, embodiments of the invention relate to a method and system for improving debug information pertaining to user variables using a compiler.

BACKGROUND

Compilers can communicate the location of user variables at run time to debuggers, program analysis tools, run-time monitors and the like. However, as compilers gained more and more optimization passes, the lack of infrastructure to retain a correspondence between source-level and run-time constructs has become a serious problem. As a result, a compiler may fail to emit location information for some local user variables or a compiler may emit locations that make it seem like variables hold unexpected values at certain points in the program.

One solution for improving debug information is to annotate the internal representation of a program, held by the compiler, with statements that bound user variables to expressions that represent the variables' location or value. FIG. 1 illustrates a prior art mechanism for annotating an internal representation of a program in a compiler system known as GNU compiler collection (GCC).

Referring to FIG. 1, source code statements 102 represent portions of an exemplary program. The source code statements 102 are converted into an internal representation 104, which includes annotations that bound user variables to debug expressions. In particular, a statement # v=>_n means that a user variable v is bound to the value held by the internal representation name_n.

An optimizing compiler realizes that _7 and _5 compute the same value, and _8 and _6 compute the same value, as shown by statements 110. Hence, the compiler discards the duplicate computations as part of the compiler optimization. In addition, the compiler realizes that _9 is assigned to zero (i.e., _6-_6), as shown by statement 112. As a result, all internal names are left unreferenced, except for the uses in debug statements 106.

As all definitions, from _1 to _8, have become unused in the executable code (excluding debug statements), the compiler is supposed to discard them while retaining as much debug information as it can. The result is a set of statements 108. As shown, expression 110 that computes the value for the optimized-away user variable f has grown exponentially, increasing memory consumption and resulting in CPU overhead when emitting debug information.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for improving debug information pertaining to user variables using a compiler are described herein. In one embodiment, a compiler identifies a statement that should be removed from its current position in an internal representation of a program as part of the compiler optimization. This statement may be a statement that should be optimized away (completely removed) or a statement that should be moved about (moved to a different location in the internal representation of the program). The compiler then replaces this statement with a debug annotation (e.g., a debug temporary such as a compiler-introduced identifier), and adds references to the debug annotation in subsequent debug expressions referring to the removed statement. Further, the compiler emits debug location information for a user variable using the debug annotation.

The use of debug annotations such as debug temporaries keeps debug expressions from exploding in size, simplifying bookkeeping of the debug expressions by the compiler. In addition, the use of debug temporaries prevents loss of debug information due to assignments to operands between assignment and bind points, and enables the compiler to easily emit debug information location subroutines, instead of duplicating this location information in location expressions at every use point, or factoring out the common sub-expressions by other means.

Figure 2:
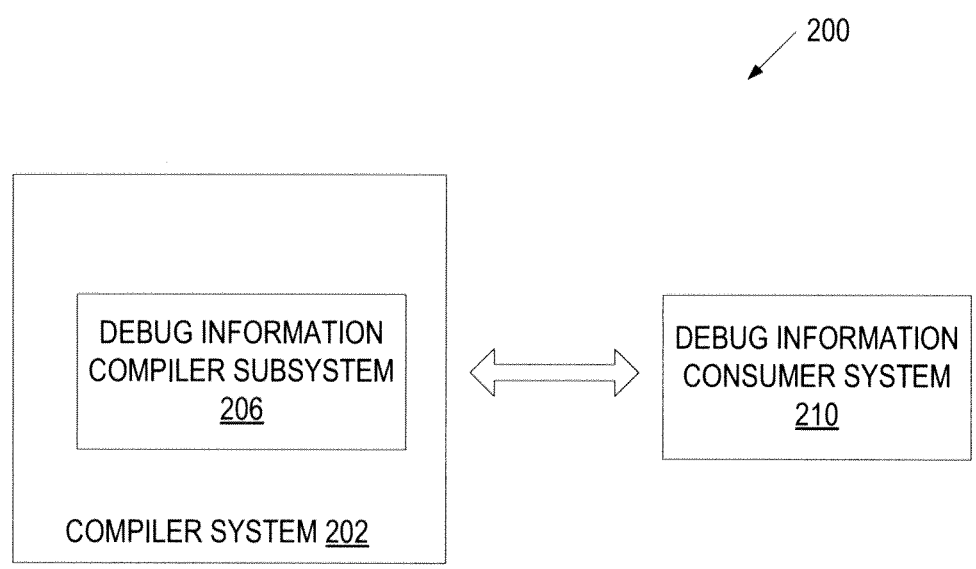
FIG. 2 is a block diagram of one embodiment of a compiling and debug information consuming system.

FIG. 2 illustrates a block diagram of one embodiment of a compiling and debug information consuming system 200. The system 200 may include a compiler system 202 and a debug information consuming system 210. The compiler system 202 may be a GNU compiler collection (GCC) system. The debug information consuming system 210 may be a debugger, a program analysis tool, a run-time monitor, or the like. The compiler system 202 and the debug information consuming system 210 may be hosted by a single machine or different machines. Such machines may include, for example, a server computer, a desktop computer, a personal computer, a personal digital assistant (PDA), an appliance, or any other other computer system. An exemplary computer system will be discussed in more detail below in conjunction with FIG. 6.

In one embodiment, the compiler system 202 includes a debug information compiler subsystem 206 that transforms a program into an internal representation, assigns debug annotations to statements within the internal representation before the statements are removed or moved elsewhere as part of the compiler optimization, and then references these debug annotations in subsequent debug expressions. A debug annotation may be a debug temporary representing a compiler-introduced identifier. The debug information compiler subsystem 206 uses the debug annotations when emitting debug location information for user variables. Debug location information for a user variable may be provided to the debug information consuming system 210 at run time, periodically or in response to a request of the debug information consuming system 210.

Figure 1:
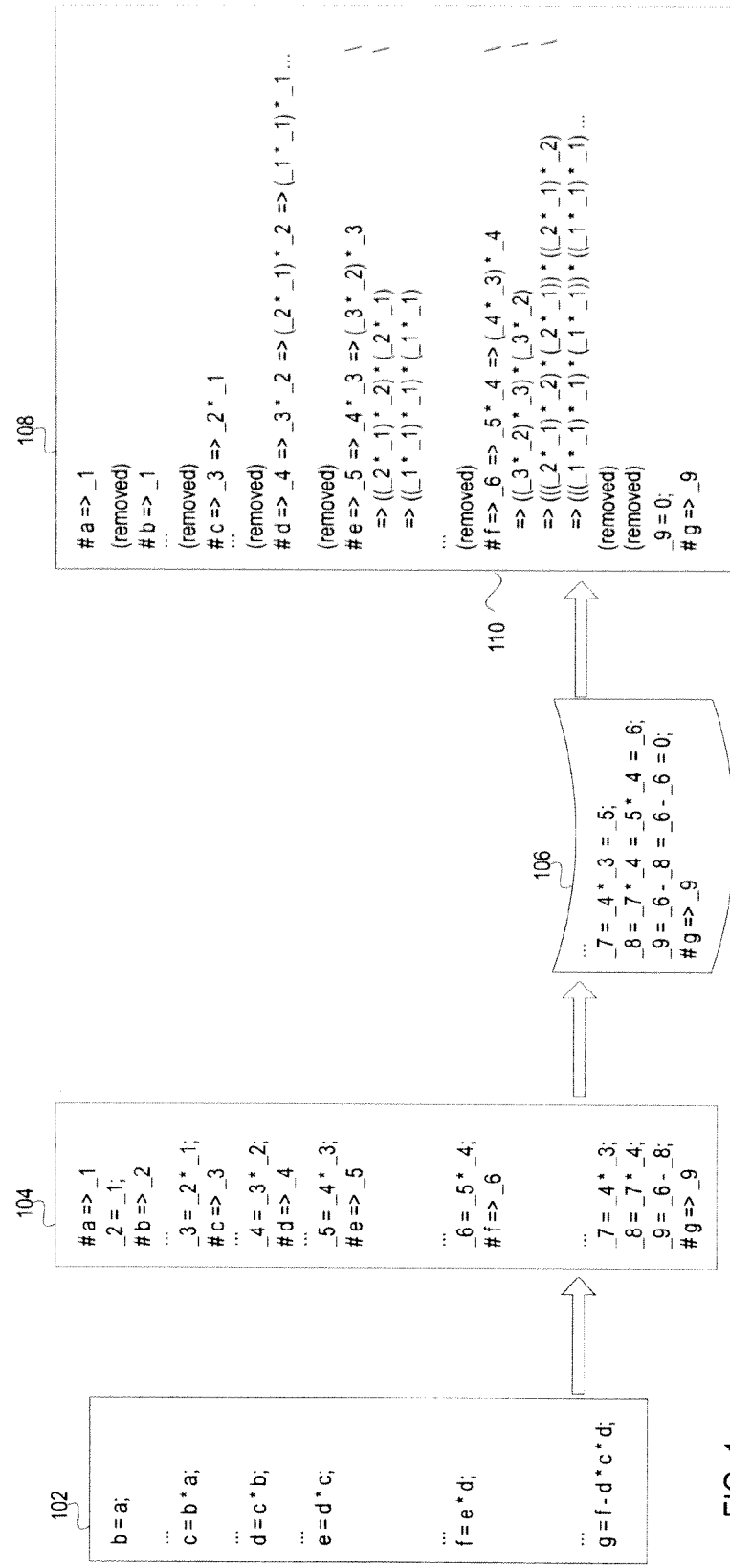
FIG. 1 illustrates a prior art mechanism for annotating an internal representation of a program in a compiler system.
Figure 3:
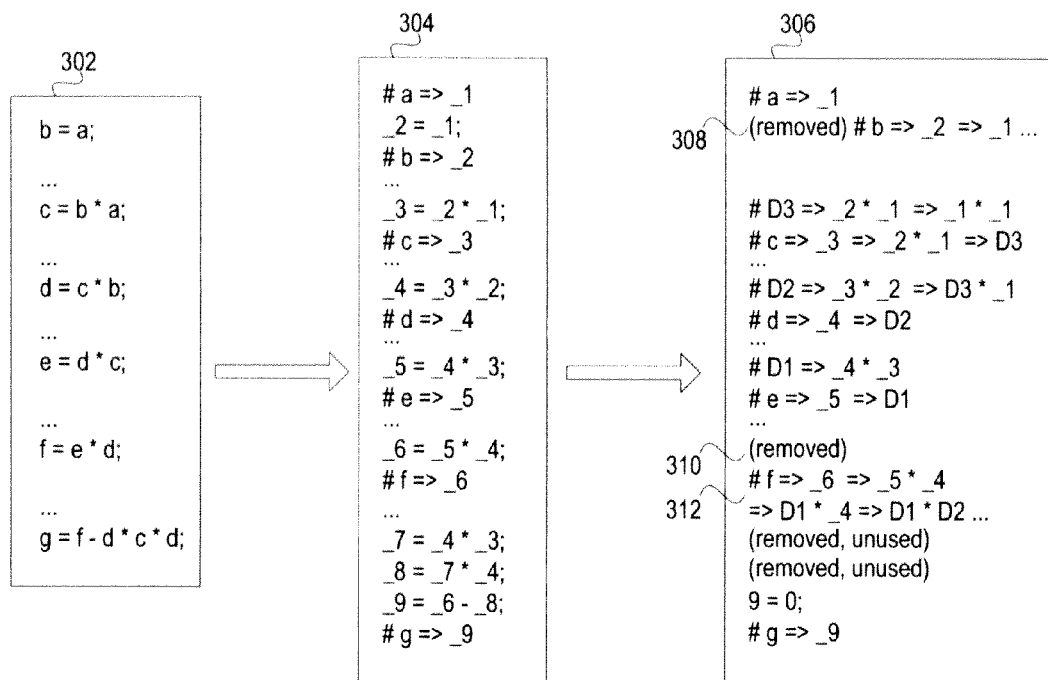
FIG. 3 illustrates a mechanism for annotating an internal representation of a program in a compiler system, according to some embodiments.

Debug location information for a user variable may identify the location of the value of the user variable in memory or in a register, or it may include some other information that will allow the debug information consuming system 210 to compute the value of the user variable. The debug information may be provided to the debug information consuming system 210 in the debug with arbitrary record format (DWARF) or any other debug information format, FIG. 3 illustrates a mechanism for annotating an internal representation of a program in the compiler system 202, according to some embodiments. In particular, source code statements 302, representing portions of an exemplary program, are converted into an internal representation 304, which includes annotations that bound user variables to debug expressions. Specifically, a statement # v=>_n means that a user variable v is bound to the value held by the internal representation name _n. As can be seen in FIG. 3, statements 302 and 304 are the same as statements 102 and 104 of FIG. 1. However, contrary to the mechanism illustrated in FIG. 1, the mechanism of FIG. 3 uses debug temporaries (debug temps) which are bound, with additional debug expressions, to the assigned statement before this statement is removed or moved elsewhere, and which are then referenced in other debug expressions. As a result, expression 312 that computes all other variables grows linearly, rather than exponentially as illustrated by expression 110 of FIG. 1.

In some embodiments, statements that should be removed or moved somewhere are replaced with debug temps only if such replacement is desirable in view of several factors. These factors may include, for example, preferences for saving space in debug information, speeding up compilation, simplifying the work to be performed by debugger, etc. In some embodiments, a replacement may be undesirable when inline substitutions such as trivial substitutions (e.g., line 308), substitutions in a single use (e.g., line 310), etc. can be made. A trivial substitution can be illustrated using the following example:

...
b = a;
...
c = b;
...

Before preforming significant optimization, the compiler may have the following statements:

DEBUG a =>_1
...
_2 = _1;
DEBUG b =>_2
...
_3 = _2;
DEBUG c =>_3
...

When the compiler realizes that _3 is unused, the compiler may decide to remove the definition of _3. The compiler may then realize that the expression assigned to _3 is a single operand (_2), that would not grow debug expressions, and that is stable and accessible at all debug expressions that refer to it. Hence, instead of introducing a debug temp, the compiler may perform a trivial substitution of _3 in the debug statement for c, which can be expressed as follows:

DEBUG c=>_2

The compiler can then simply remove the assignment of _3, without introducing any debug temp. Another trivial substitution can take place when the compiler realizes that _2 was also unused and that the bound expression _1 is accessible at all debug statements that reference _2. The compiler can then perform the following trivial substitution:

DEBUG b =>_1
...
DEBUG c =>_1

In some embodiments, a replacement may be undesirable when the compiler can avoid the overhead of introducing a debug temp, effectively performing an early inline substitution, when the symbol defined in the statement is referenced in only one location. This is referred as a "substitution in a single use." The removal of the _3 assignment above can also qualify as a substitution in a single use, but other situations can be qualified as well. A substitution in a single use is a case in which the definition would make debug expressions grow, but since the removed definition is only used once, the growth will be very limited (as opposed to potentially exponential) and most likely profitable (the debug temp would most likely be just overhead). Consider the following example:

_3=_1+_2;
DEBUG x=>_3

In this example, once the compiler realizes that _3 is not used elsewhere, and that _1 and _2 are accessible at the debug statement, the compiler can substitute it in the single debug use and drop the assignment altogether, without a debug temp:

DEBUG x=>_1+_2

This is more desirable than emitting the following debug temp:

DEBUG #1=>_1+_2
DEBUG x=>#1

However, if _3 was referenced in more than one debug expression or more than once in a single debug expression, then the use of a debug temp (as opposed to an inline substitution) would be desirable. One such an example is the following debug expression:

DEBUG x=>_3*_3

If debug temps are not used, this debug expression will grow as follows:

DEBUG x=>(_1+_2)*(_1+_2)

If the above operation is performed repeatedly (e.g., similarly for _1 and _2 and other symbols referenced in their definitions), it will exhibit the very excessive growth of debug expressions that embodiments of the invention are directed to avoid.

Figure 4:
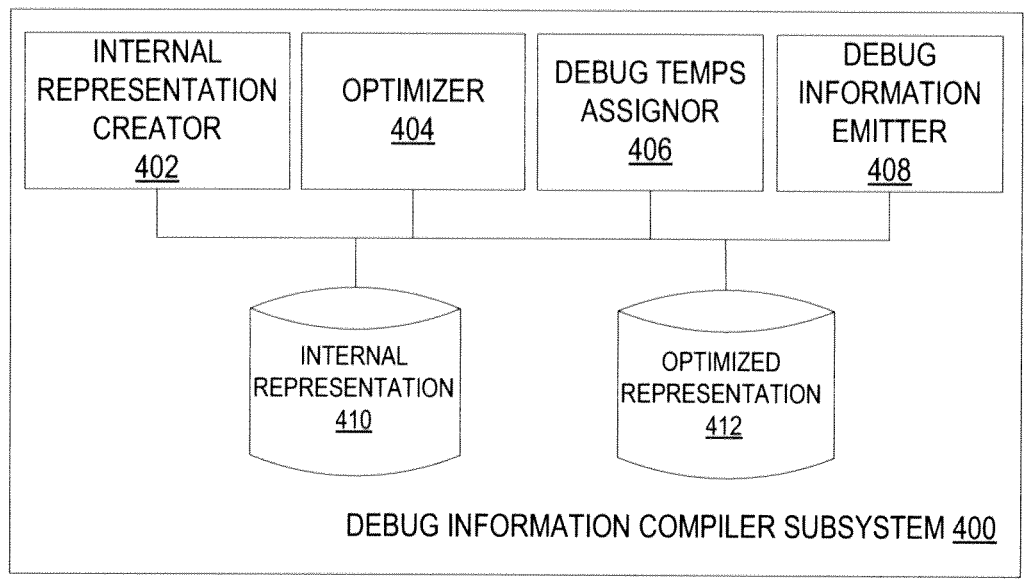
FIG. 4 is a block diagram of one embodiment of a debug information compiler subsystem.

FIG. 4 is a block diagram of one embodiment of a debug information compiler subsystem 400. The subsystem 400 may include an internal representation creator 402, an optimizer 404, a debug temps assignor 406, and a debug information emitter 408. It should be noted that the above components are provided for illustration purposes, and that the subsystem 400 may include more or less components without loss of generality.

The internal representation creator 402 transforms a program into an internal representation as discussed above with reference to FIG. 3. The resulting internal representation of the program can be stored in a store 410, which may be a file, a database, a repository, or any other data structure(s) residing on one or more electronic devices, such as main memory, or on one or more mass storage devices, such as magnetic or optical storage based disks, tapes or hard drives.

The optimizer 404 optimizes the internal representation of the program, identifies statements that are to be removed or moved elsewhere as part of the compiler optimization, and informs the debug temps assignor 406 about these statements. The debug temps assignor 406 replaces these statements with debug temps, and adds references to the debug temps in subsequent debug expressions referring to the removed statements. As discussed above, in some embodiments, the debug temps assignor 406 does not perform a debug temp replacement if the statement to be replaced constitutes a special case (e.g., a trivial substitution case, a a substitution in a single use case, etc.). The resulting optimized representation of the program is stored in a data store 412, which may be a file, a database, a repository, or any other data structure(s) residing on one or more electronic devices, such as main memory, or on one or more mass storage devices, such as magnetic or optical storage based disks, tapes or hard drives.

The debug information emitter 408 provides debug location information for user variables to a debugger or another debug information consumer. The debug location information may identify the location of the value of the user variable in memory or in a register, or it may consist of an expression involving constants, registers and memory locations, that yields the value the variable should hold if it had not been optimized away.

In some embodiments, the debug information emitter 408 substitutes occurrences of debug temps with expressions that evaluate the value bound to the debug temp, if it is computable or available elsewhere. In one embodiment, the debug information emitter 408 emits declarations of artificial variables in debug information, corresponding to the debug temps. Artificial variables may need to be used because debug temps cannot be present in executable code, only in annotations used to generate debug information, and no run-time storage can be generated for debug temps. Indeed, the compiler ought to generate the same executable code, regardless of whether debug temps (or any other debug annotations) are introduced.

The debug information emitter 408 may emit location information for user variables that reference debug temps using the artificial variables to stand for the debug temps in location expressions. The debug information emitter 408 can emit location information for artificial variables as if they were user variables. Further, the debug information emitter 408 may emit location information for user variables that reference debug temps using location expressions that evaluate the location or the value bound to the debug temps. This inline substitution of location expressions may enable simplifications of the expressions, which some embodiments of the invention may perform.

In one embodiments, the debug information emitter 408 decides whether to introduce artificial variables and/or perform inline substitutions of debug temps depending on various factors, such as preferences for saving space in debug information, speeding up compilation, simplifying the work to be performed by a debugger, etc.

Figure 5:
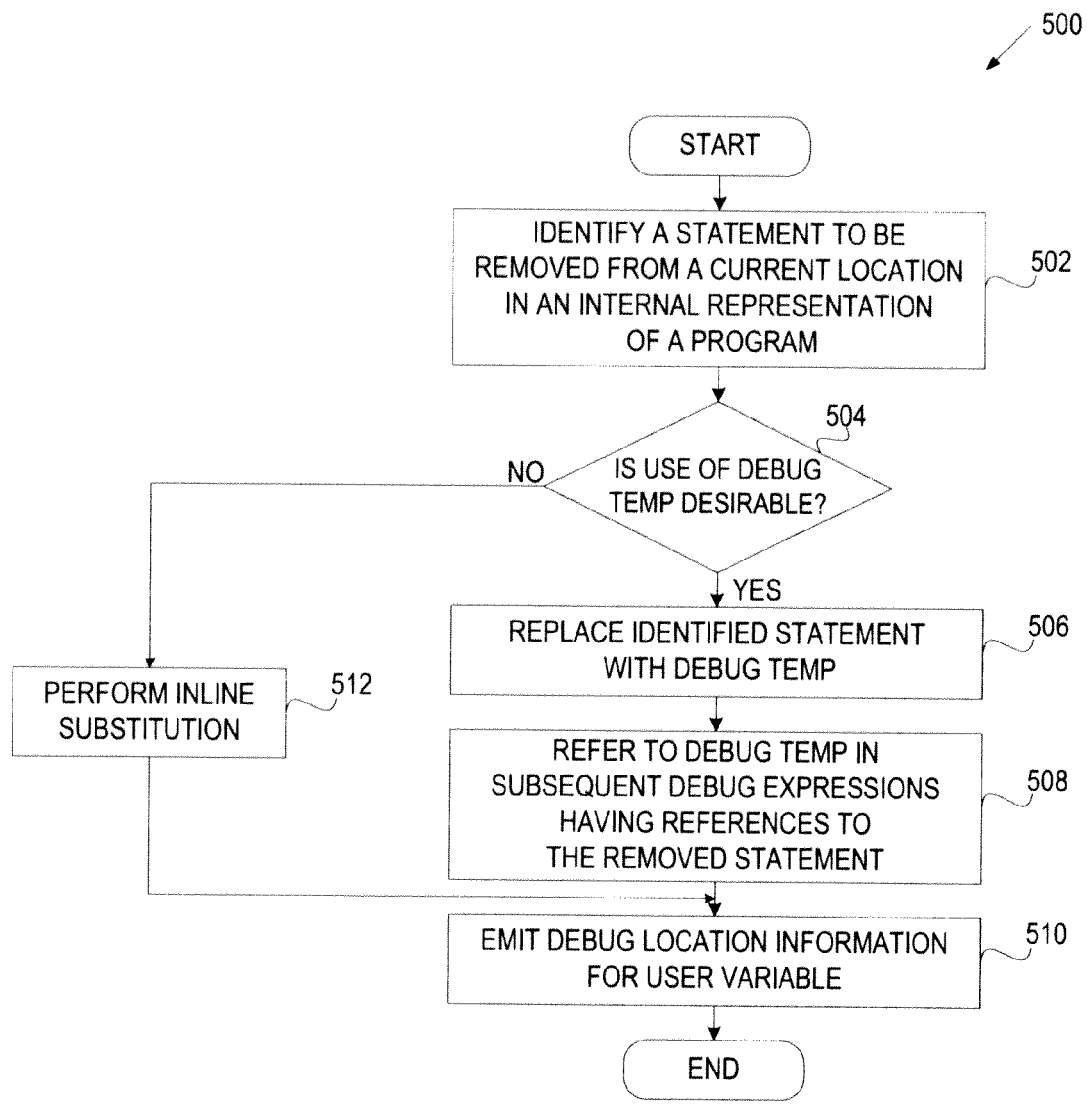
FIG. 5 is a flow diagram of one embodiment of a method for improving debug information pertaining to user variables using a compiler.

FIG. 5 is a flow diagram of one embodiment of a method 500 for improving debug information pertaining to user variables using a compiler. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by a debug information compiler subsystem 206 of FIG. 2.

Referring to FIG. 5, method 500 begins with a debug information compiler subsystem identifying a statement to be removed from its current position in an internal representation of a program as part of compiler optimization (block 502). The compiler may be a GCC compiler system. The statement to be removed may be a statement to be optimized away or to be moved elsewhere in the internal representation of the program.

At block 504, the debug information compiler subsystem determines whether it is desirable to replace the identified statement with a debug temp. The determination may be made using such factors as preferences for saving space in debug information, speeding up compilation, simplifying the work to be performed by debugger, etc.

If the determination is negative, the debug information compiler subsystem performs a conventional inline substitution (block 512) and proceeds to block 510. If the determination is positive, the debug information compiler subsystem replaces the identified statement with a debug temp (block 506), and refers to the debug temp in subsequent debug expressions having references to the removed statement (block 508).

At run time, the debug information compiler subsystem emits debug location information for user variables (block 510). As discussed in more detail above, the debug information compiler subsystem can emit debug location information using corresponding debug temps.

Figure 6:
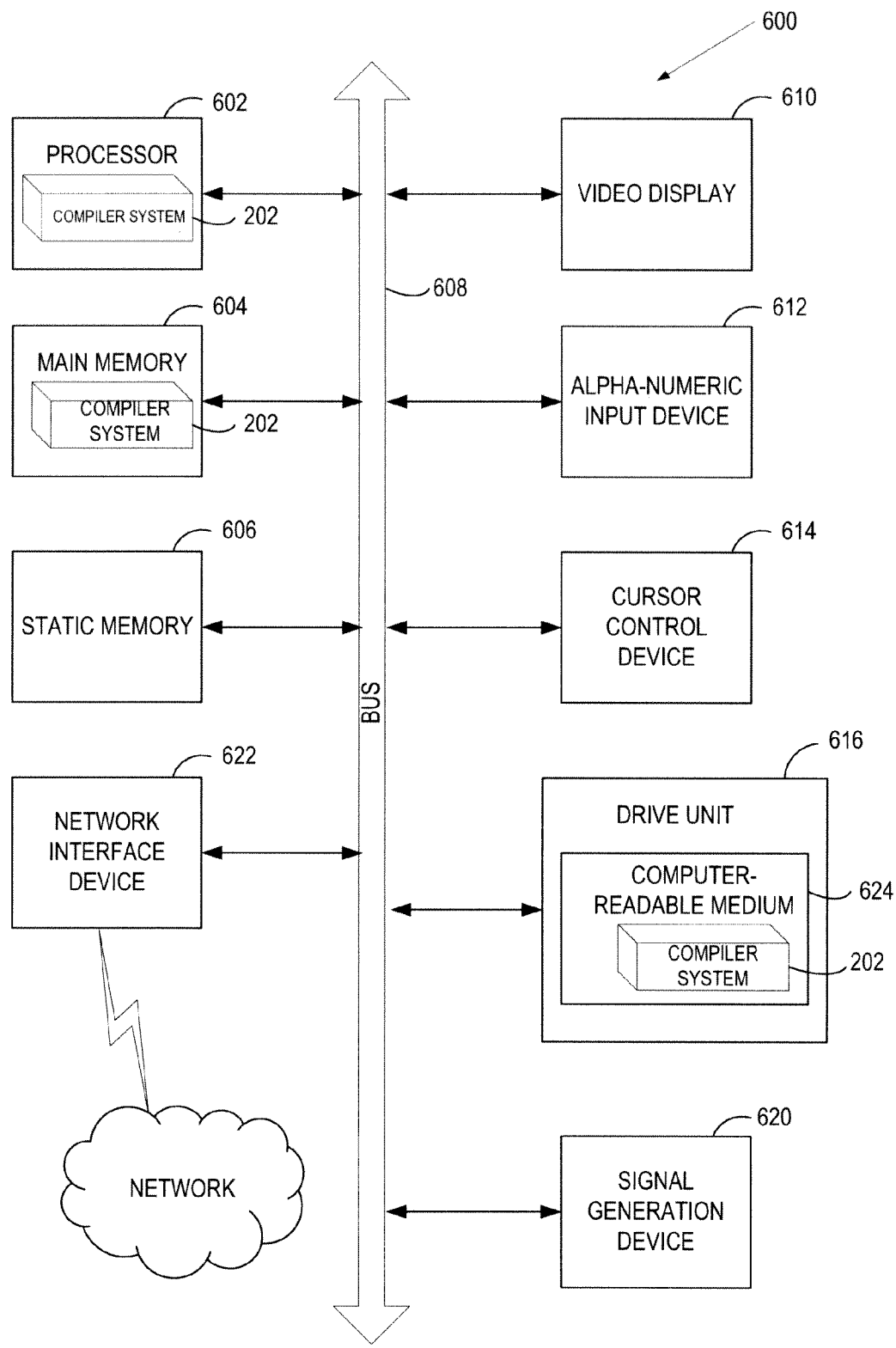
FIG. 6 is a block diagram of one embodiment of a computer system for improving debug information pertaining to user variables.

FIG. 6 is a block diagram of one embodiment of a computer system 600 for improving debug information pertaining to user variables. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server machine or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes one or more processing devices 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing devices 602 represent one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute instructions for a compiler system 202 for performing the operations and steps discussed herein.

The computer system 600 may further include a network device 622 (e.g., NIC, Ethernet network card, etc.). The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions for a compiler system 202 embodying any one or more of the methodologies or functions described herein. The instructions for compiler system 202 may also reside, completely or at least partially, within the main memory 604 and/or within the processing device 602 during execution thereof by the computer system 600, the main memory 604 and the processing device 602 also constituting machine-readable storage media. The instructions for an enhanced authentication system 112 may further be transmitted or received over a network 618 via the network device 622.

The computer-readable storage medium 624 may also be used to store the instructions for compiler system 202 persistently. While the computer-readable storage medium 626 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The components and other features described herein (for example in relation to FIG. 2) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "replacing," "adding," "responding," "providing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for improving debug information using a compiler has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    identifying, by a processing device, a statement to be removed from a current position in an internal representation of a program by a compiler as part of compiler optimization, the statement comprising an assignment of a result of a computation to an internal representation name;
    identifying, by the processing device, the internal representation name in elements in a debug expression of a debug statement, wherein the debug statement describes a variable bound to an expression that represents the variable's value;
    determining, by the processing device, whether the internal representation name is not further used and is assigned to a single operand;
    in response to determining that the internal representation name is not further used and is assigned to the single operand, substituting, by the processing device, the internal representation name with the single operand;
    replacing, by the processing device, the statement to be removed with a compiler- introduced debug annotation, wherein the compiler-introduced debug annotation comprises an artificial variable bound to a value that would have been computed by the removed statement described by an expression of the computation;
    adding, by the processing device, references to the artificial variable in the compiler-introduced debug annotation in the debug expression referring to the internal representation name; and
    providing, by the processing device, debug location information for a user variable using a declaration of the compiler-introduced debug annotation, wherein the debug location information comprises the user variable and an expression that, using elements of the compiler-introduced debug annotation, describes a location or a value of the user variable.

2. The method of claim 1 wherein the statement to be removed from the current position in the internal representation of the program is a statement to be removed during the compiler optimization or a statement to be moved to a different location in the internal representation of the program during the compiler optimization.

3. The method of claim 1 wherein the compiler-introduced debug annotation is a debug temporary representing a compiler introduced identifier.

4. The method of claim 1 further comprising:
    prior to replacing the statement to be removed with the compiler-introduced debug annotation, determining whether the use of the compiler-introduced debug annotation is desirable; and
    in response to a determination that the use of the compiler-introduced debug annotation is undesirable, performing an inline substitution.

5. The method of claim 1 wherein providing the debug location information for the user variable using the compiler-introduced debug annotation further comprises
    emitting location information for the artificial variable imitating the user variable.

6. The method of claim 1 wherein providing the debug location information for the user variable using the compiler-introduced debug annotation further comprises:
    emitting location information for the user variable that references the compiler-introduced debug annotation using a location expression that evaluates a location or a value bound to the compiler-introduced debug annotation.

7. A non-transitory computer readable storage medium comprising instruction, which when executed by a processing device, cause the processing device to execute operations comprising:
    identify, by the processing device, a statement to be removed from a current position in an internal representation of a program by a compiler as part of compiler optimization, the statement comprising an assignment of a computation to an internal representation name;
    identify, by the processing device, the internal representation name in elements in a debug expression of a debug statement, wherein the debug statement describes a variable bound to an expression that represents the variable's value;
    determine, by the processing device, whether the internal representation name is not further used and is assigned to a single operand;
    in response to the determination that the internal representation name is not further used and is assigned to the single operand, substitute, by the processing device, the internal representation name with the single operand;
    replace, by the processing device, the statement to be removed with a compiler-introduced debug annotation, wherein the compiler-introduced debug annotation comprises an artificial variable bound to a value that would have been computed by the removed statement described by an expression of the computation;
    add, by the processing device, references to the artificial variable in the compiler-introduced debug annotation in the debug expression referring to the internal representation name; and
    provide, by the processing device, debug location information for a user variable using a declaration of the compiler-introduced debug annotation, wherein the debug location information comprises the user variable and expression that, using elements of the compiler-introduced debug annotation, describes a location or a value of the user variable.

8. The non-transitory computer readable storage medium of claim 7 wherein the statement to be removed from the current position in the internal representation of the program is a statement to be removed during the compiler optimization or a statement to be moved to a different location in the internal representation of the program during the compiler optimization.

9. The non-transitory computer readable storage medium of claim 7 wherein the compiler-introduced debug annotation is a debug temporary representing a compiler introduced identifier.

10. The non-transitory computer readable storage medium of claim 7 wherein the operations further comprise
    emitting location information for the artificial variable imitating the user variable.

11. The non-transitory computer readable storage medium of claim 7 wherein the operations further comprise
    emitting location information for the user variable that references the compiler-introduced debug annotation using a location expression that evaluates a location or a value bound to the compiler-introduced debug annotation.

12. A system comprising:
a memory; and
a processing device, operatively coupled to the memory, to:
identify a statement to be removed from a current position in an internal representation of a program by a compiler as part of compiler optimization, the statement comprising an assignment of a computation to an internal representation name;
identify the internal representation name in elements in a debug expression of a debug statement, wherein the debug statement describes a variable bound to an expression that represents the variable's value;
determine whether the internal representation name is not further used and is assigned to a single operand;
in response to determine that the internal representation name is not further used and is assigned to the single operand, substitute the internal representation name with the single operand;
replace the statement to be removed with a compiler-introduced debug annotation, wherein the compiler-introduced debug annotation comprises an artificial variable bound to a value that would have been computed by the removed statement described by an expression of the computation;
add references to the artificial variable in the compiler-introduced debug annotation in the debug expression referring to the internal representation name; and
provide debug location information for a user variable using a declaration of the compiler-introduced debug annotation, wherein the debug location information comprises the user variable and an expression that, using elements of the compiler-introduced debug annotation, describes a location or a value of the user variable.

13. The system of claim 12 wherein the statement to be removed from the current position in the internal representation of the program is a statement to be removed during the compiler optimization or a statement to be moved to a different location in the internal representation of the program during the compiler optimization.

14. The system of claim 12 wherein the compiler-introduced debug annotation is a debug temporary representing a compiler introduced identifier.

15. The system of claim 12, the processing device further to provide location information for the artificial variable imitating the user variable.

16. The system of claim 12, the processing device further to provide location information for the user variable that references the compiler-introduced debug annotation using a location expression that evaluates a location or a value bound to the compiler-introduced debug annotation.

* * * * *